(12) United States Patent
Chang

(10) Patent No.: US 12,737,042 B2
(45) Date of Patent: Sep. 15, 2026

(54) CONTROL METHOD, AUGMENTED REALITY DEVICE, AND COMPUTER-READABLE STORAGE MEDIUM

(71) Applicant: TRIPLE WIN TECHNOLOGY(SHENZHEN) CO. LTD., Shenzhen (CN)

(72) Inventor: Chih-Liang Chang, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 19/212,984

(22) Filed: May 20, 2025

(65) Prior Publication Data

US 2026/0169554 A1 Jun. 18, 2026

(30) Foreign Application Priority Data

Dec. 17, 2024 (CN) ........................ 202411861596.4

(51) Int. Cl.
*G06F 3/01* (2006.01)

(52) U.S. Cl.
CPC .............. *G06F 3/013* (2013.01); *G06F 3/012* (2013.01)

(58) Field of Classification Search
CPC .......... G02B 27/017; G02B 2027/0178; G02B 27/02; G02B 27/021; G02B 27/022; G02B 2027/0187; G02B 2027/014; G02B 27/0093; G02B 27/0075; G02B 3/14; G02B 7/10; G06F 3/013; G06F 3/012; G06F 3/011; G06T 19/006; G02C 7/061; G02C 7/06; G02C 2202/24; G02C 7/083
See application file for complete search history.

(56) References Cited

U.S. PATENT DOCUMENTS 10,324,309 B2 * 6/2019 Hyde ........................ A61F 2/16

* cited by examiner

*Primary Examiner* — Koosha Sharifi-Tafreshi
(74) *Attorney, Agent, or Firm* — ScienBiziP, P.C.

(57) ABSTRACT

A control method for an AR device is provided. The control method comprising: when the AR device is in a worn state, acquiring a line-of-sight direction of a user; when an angle between the line-of-sight direction of the user and a gravity direction is greater than or equal to 90 degrees, setting an electrical power to the AR device to a first power; when the angle between the line-of-sight direction of the user and the gravity direction is less than 90 degrees, setting the electrical power to the AR device to a second power, wherein the second power is less than the first power.

20 Claims, 8 Drawing Sheets

CONTROL METHOD, AUGMENTED REALITY DEVICE, AND COMPUTER-READABLE STORAGE MEDIUM

CROSS-REFERENCE TO RELATED APPLICATIONS

This application claims priority to Chinese Patent Application No. 202411861596.4 filed on Dec. 17, 2024, in China National Intellectual Property Administration, the contents of which are incorporated by reference herein.

FIELD

The subject matter herein generally relates to augmented reality (AR) technology field, and more particularly to control method, augmented reality device, and computer-readable storage medium.

BACKGROUND

Augmented reality (AR) technology integrates virtual information with a real world by employing multimedia, 3D modeling, real-time tracking and registration, intelligent interaction, and sensing technologies. AR technology superimposes computer-generated text, images, 3D models, music, videos, and other virtual information onto the real world, such that an interaction with a real environment is enabled. However, AR devices typically consume significant power, leading to insufficient battery life.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
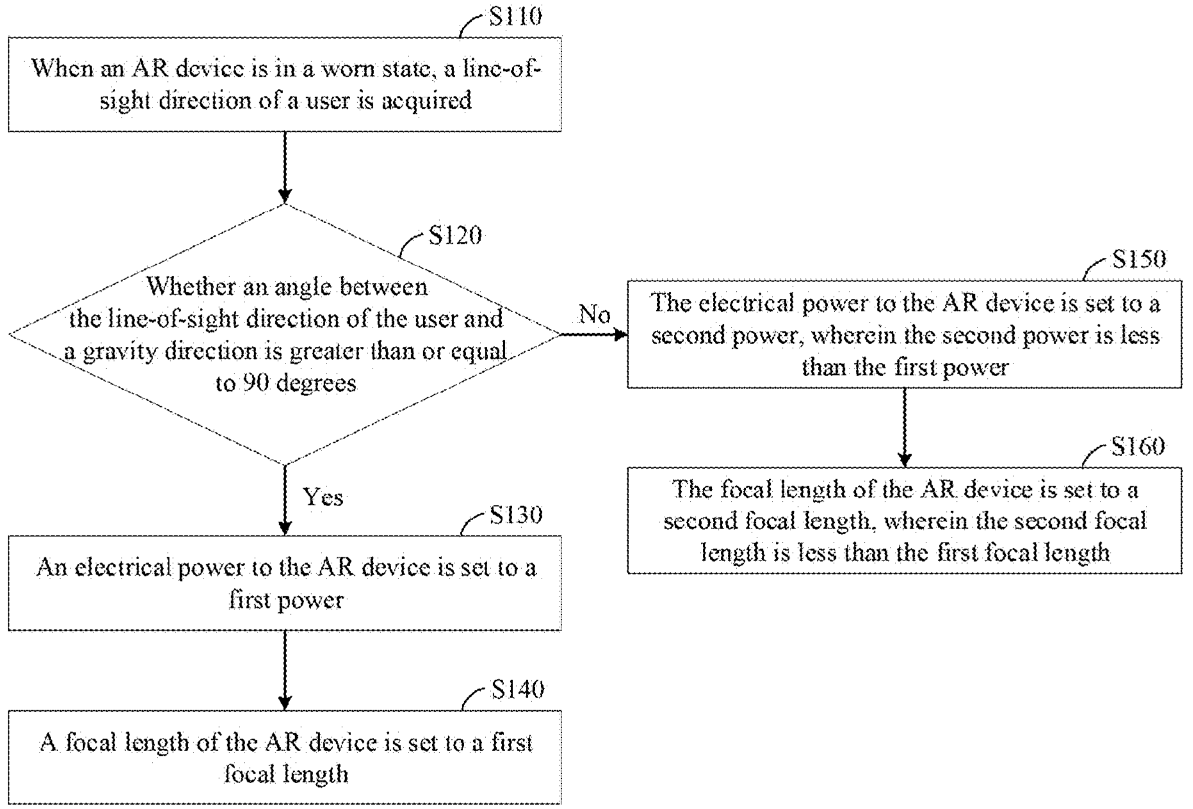
FIG. 1 is a flowchart of a control method provided by an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better show details and features of the present disclosure.

Several definitions that apply throughout this disclosure will now be presented.

The term "coupled" is defined as connected, whether directly or indirectly through intervening components, and is not necessarily limited to physical connections. The connection may be such that the objects are permanently connected or releasably connected. The term "comprising," when utilized, means "including, but not necessarily limited to"; it specifically indicates open-ended inclusion or membership in the so-described combination, group, series, and the like.

FIG. 1 is a flowchart of a control method provided by an embodiment. As shown in FIG. 1, the control method includes the following blocks.

At block S110, when an AR device is in a worn state, a line-of-sight direction of a user is acquired.

In block S110, the AR device may be, but is not limited to, a pair of AR glasses or an AR headset.

In block S110, when the AR device switches to the worn state, a change in a physical contact parameter (e.g., pressure, magnetic field) or an environmental parameter (e.g., capacitance) occurs.

In an embodiment, the AR device includes a pressure sensor, used to detect a pressure change between the AR device and the user's skin. When the pressure change is detected, it indicates that the AR device is in the worn state.

In another embodiment, when the AR device includes a Hall sensor, used to detect a magnetic field change between the AR device and the user's skin. When the magnetic field change is detected, it indicates that the AR device is in the worn state.

In another embodiment, when the AR device includes a capacitive sensor, used to detect a distance change between the AR device and the user's skin. When the distance change is detected, it indicates that the AR device is in the worn state.

In block S110, the AR device includes an eye-tracking device, used to detect the line-of-sight direction of the user. The eye-tracking device may include an infrared image sensor, used to capture an eye image of the user. A relative position of a pupil center (PC) and a corneal reflection point (CR) is calculated according to the eye image of the user, and the line-of-sight direction of the user is calculated according to the relative position and an eye geometry parameter, wherein the eye geometry parameter may include a radius and a center position.

At block S120, whether an angle between the line-of-sight direction of the user and a gravity direction is greater than or equal to 90 degrees.

In block S120, when the angle between the line-of-sight direction of the user and the gravity direction is greater than or equal to 90 degrees, blocks S130-S140 are implemented. When the angle between the line-of-sight direction of the user and the gravity direction is less than 90 degrees, blocks S150-S160 are implemented.

In block S120, the gravity direction is vertically downward. When the angle between the line-of-sight direction of the user and the gravity direction is greater than or equal to 90 degrees, it indicates the user is looking far. When the angle between the line-of-sight direction of the user and the gravity direction is less than 90 degrees, it indicates the user is looking near.

At block S130, an electrical power to the AR device is set to a first power.

At block S140, a focal length of the AR device is set to a first focal length.

At block S150, the electrical power to the AR device is set to a second power, wherein the second power is less than the first power.

At block S160, the focal length of the AR device is set to a second focal length, wherein the second focal length is less than the first focal length.

In this embodiment, a line-of-sight distance of the user is determined based on the line-of-sight direction of the user. When the line-of-sight distance of the user is far, a higher power level is set to enable longer detect distance of the AR device, and a longer focal length is set for a narrower field of view, such that the user may focus on environmental information at a longer distance. When the line-of-sight distance of the user is near, a lower power level is set to enable a shorter detect distance of the AR device, and a shorter focal length is set for a wider field of view, such that environmental information within a line of sight of the user is more abundant. The electrical power supplied to the AR device is optimized by making it flexible and adjustable without compromising the user experience, thereby improving the battery life of the AR device.

Figure 2:
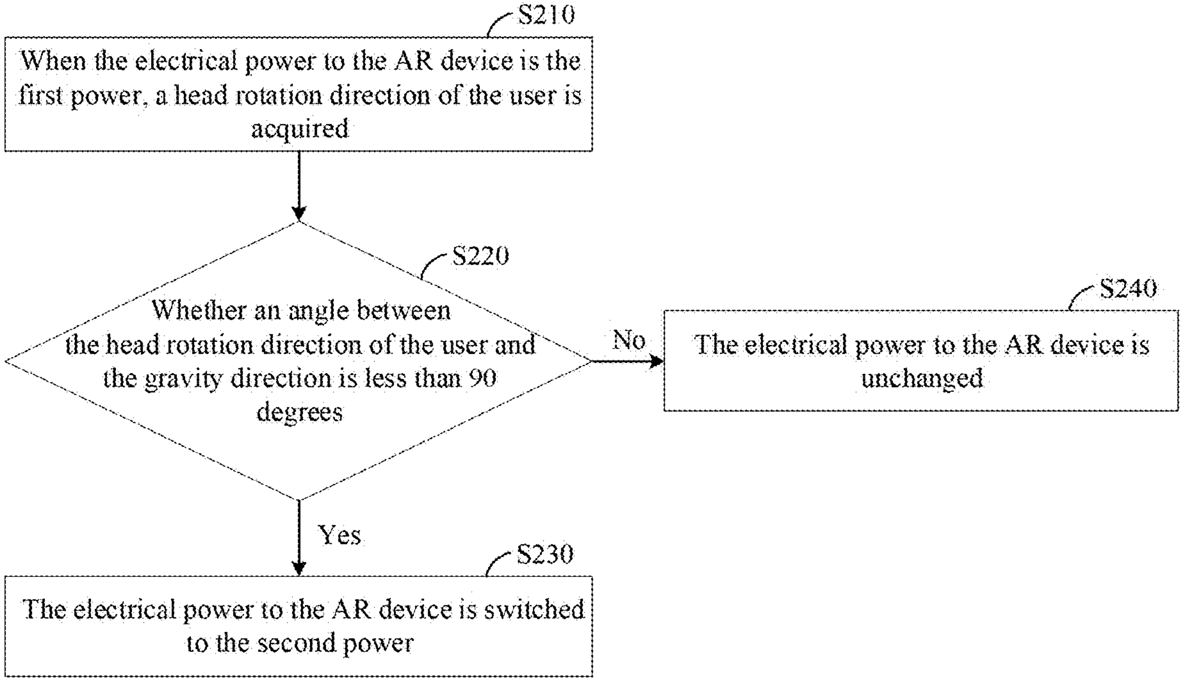
FIG. 2 is a flowchart of a control method provided by another embodiment of the present disclosure.

FIG. 2 is a flowchart of a control method provided by another embodiment. As shown in FIG. 2, the control method includes the following blocks.

At block S210, when the electrical power to the AR device is the first power, a head rotation direction of the user is acquired.

In block S210, the AR device includes an inertial measurement unit (IMU), used to detect the head rotation direction of the user. The IMU includes a gyroscope, used to detect a head angular velocity of the user, and the head rotation direction of the user is calculated according to the head angular velocity of the user.

At block S220, whether an angel between the head rotation direction of the user and the gravity direction is less than 90 degrees.

In block S220, when the angel between the head rotation direction of the user and the gravity direction is less than 90 degrees, it indicates that the user is in a bow head state, and block S230 is implemented. When the angel between the head rotation direction of the user and the gravity direction is greater than or equal to 90 degrees, it indicates that the user is in a head up state, and block S240 is implemented.

At block S230, the electrical power to the AR device is switched to the second power.

At block S240, the electrical power to the AR device is unchanged.

In this embodiment, when the electrical power to the AR device is the first power, whether the user is in the head up state or the bow head state is determined according to the head rotation direction of the user. When the user is in the bow head state, it indicates that the line-of-sight distance of the user gradually becomes closer, a lower power level is set to enable a shorter detect distance of the AR device.

Figure 3:
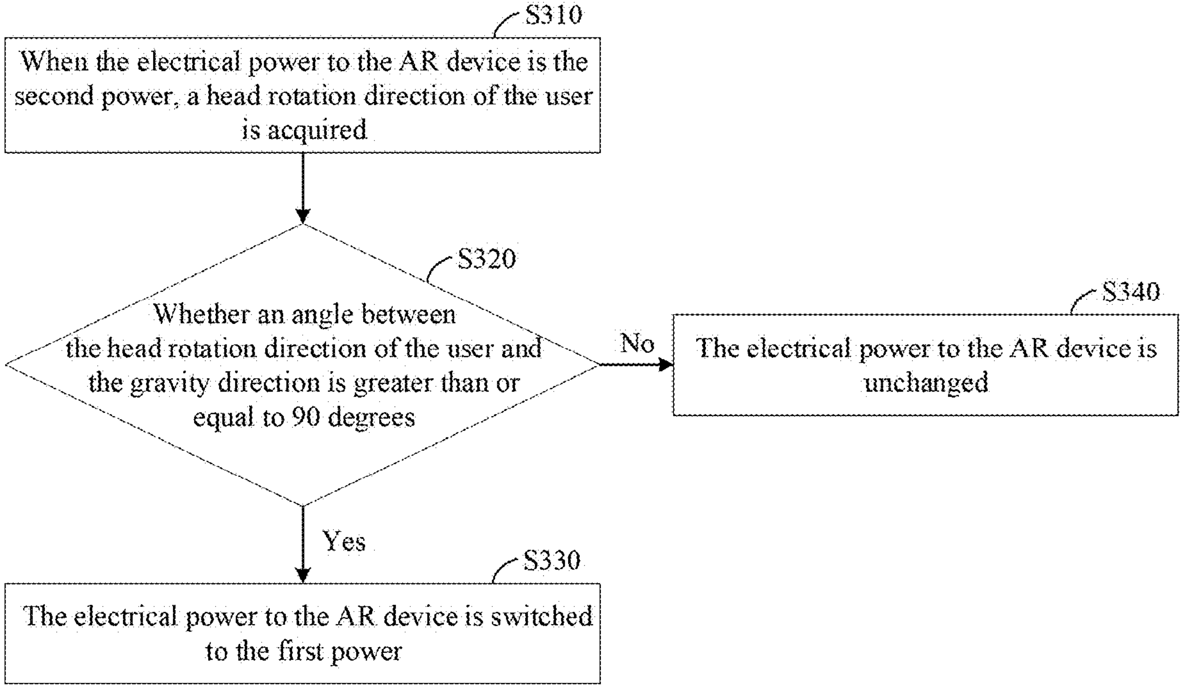
FIG. 3 is a flowchart of a control method provided by another embodiment of the present disclosure.

FIG. 3 is a flowchart of a control method provided by another embodiment. As shown in FIG. 3, the control method includes the following blocks.

At block S310, when the electrical power to the AR device is the second power, a head rotation direction of the user is acquired.

At block S320, whether an angel between the head rotation direction of the user and the gravity direction is greater than or equal to 90 degrees.

In block S320, when the angel between the head rotation direction of the user and the gravity direction is greater than or equal to 90 degrees, block S330 is implemented. When the angel between the head rotation direction of the user and the gravity direction is less than 90 degrees, block S340 is implemented.

At block S330, the electrical power to the AR device is switched to the first power.

At block S340, the electrical power to the AR device is unchanged.

In this embodiment, when the electrical power to the AR device is the second power, whether the user is in the head up state or the bow head state is determined according to the head rotation direction of the user. When the user is in the head up state, it indicates that the line-of-sight distance of the user gradually becomes longer, a higher power level is set to enable a longer detect distance of the AR device.

Figure 4:
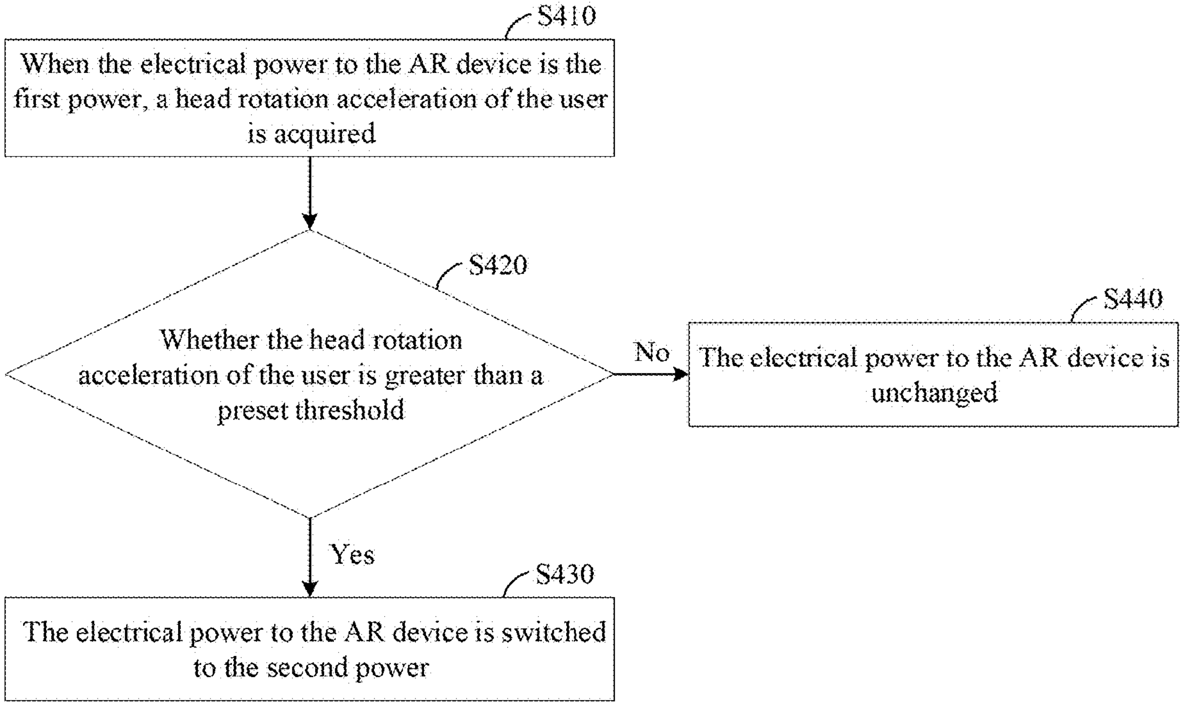
FIG. 4 is a flowchart of a control method provided by another embodiment of the present disclosure.

FIG. 4 is a flowchart of a control method provided by another embodiment. As shown in FIG. 4, the control method includes the following blocks.

At block S410, when the electrical power to the AR device is the first power, a head rotation acceleration of the user is acquired.

In block S410, the AR device includes the IMU, and the IMU includes an accelerometer, used to detect the head rotation acceleration of the user.

At block S420, whether the head rotation acceleration of the user is greater than a preset threshold.

In block S420, when the head rotation acceleration of the user is greater than the preset threshold, it indicates that the user may not perceive environmental information within a line of sight during the user's head rotation, and block S430 is implemented. When the head rotation acceleration of the user is less than or equal to the preset threshold, it indicates that the user may perceive environmental information within a line of sight during the user's head rotation, and block S440 is implemented.

At block S430, the electrical power to the AR device is switched to the second power.

At block S440, the electrical power to the AR device is unchanged.

In this embodiment, when the electrical power to the AR device is the first power, whether the user may perceive environmental information within a line of sight is determined according to the head rotation acceleration of the user. When the user may not perceive environmental information within a line of sight during the user's head rotation, a lower power level is set to reduce power consumption.

Figure 5:
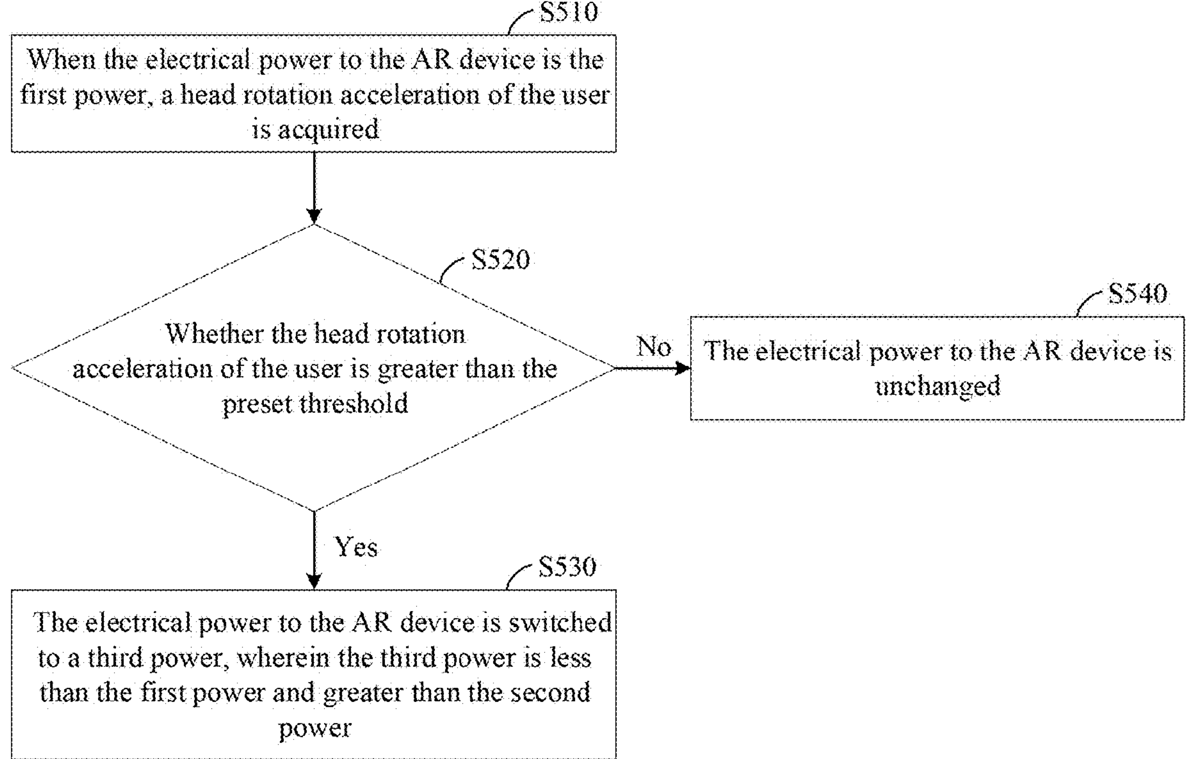
FIG. 5 is a flowchart of a control method provided by another embodiment of the present disclosure.

FIG. 5 is a flowchart of a control method provided by another embodiment. As shown in FIG. 5, the control method includes the following blocks.

At block S510, when the electrical power to the AR device is the first power, a head rotation acceleration of the user is acquired.

At block S520, whether the head rotation acceleration of the user is greater than the preset threshold.

In block S520, when the head rotation acceleration of the user is greater than the preset threshold, block S530 is implemented. When the head rotation acceleration of the user is less than or equal to the preset threshold, block S540 is implemented.

At block S530, the electrical power to the AR device is switched to a third power, wherein the third power is less than the first power and greater than the second power.

At block S540, the electrical power to the AR device is unchanged.

In this embodiment, the electrical power to the AR device is divided into three levels. When an angle between the line of sight of the user and the gravity direction is greater than or equal to 90 degrees, or an angle between the head rotation direction of the user and the gravity direction is greater than or equal to 90 degrees, the electrical power to the AR device is the highest level, which is the first power. When an angle between the line of sight of the user and the gravity direction is less than 90 degrees, or an angel between the head rotation direction of the user and the gravity direction is less than 90 degrees, the electrical power to the AR device is the lowest level, which is the second power. When the head rotation acceleration of the user is greater than the preset threshold, the electrical power to the AR device is a middle level, which is the third power.

Figure 6:
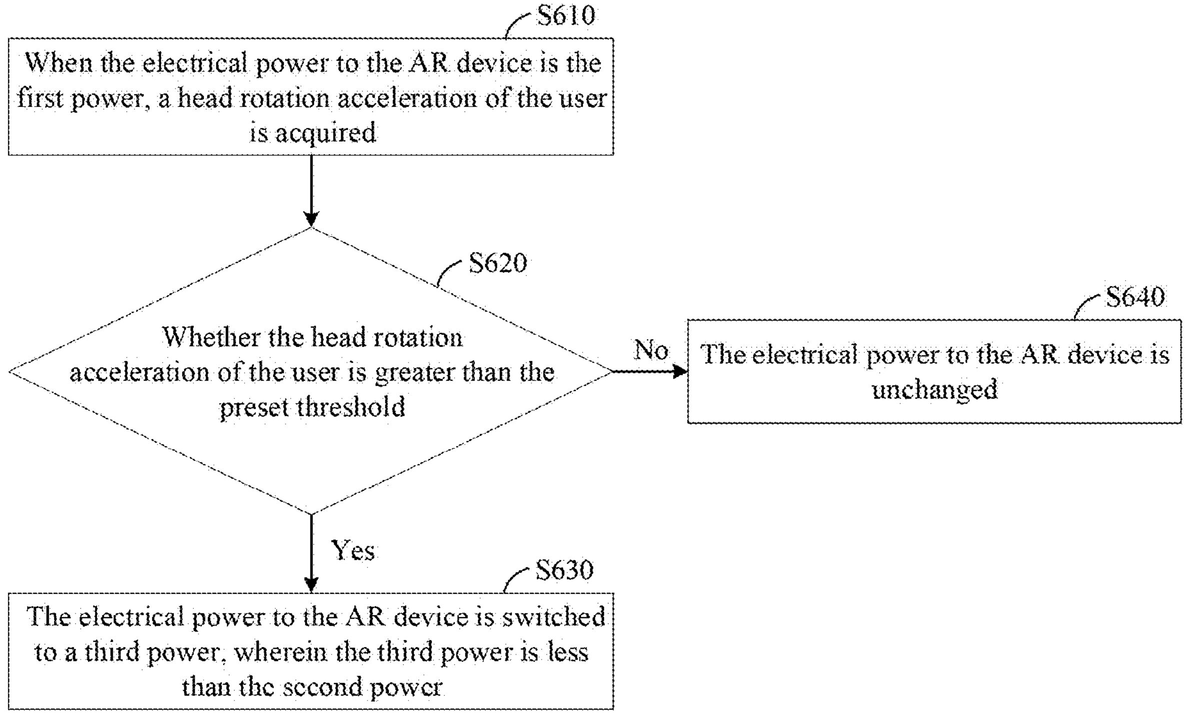
FIG. 6 is a flowchart of a control method provided by another embodiment of the present disclosure.

FIG. 6 is a flowchart of a control method provided by another embodiment. As shown in FIG. 6, the control method includes the following blocks.

At block S610, when the electrical power to the AR device is the second power, a head rotation acceleration of the user is acquired.

At block S620, whether the head rotation acceleration of the user is greater than the preset threshold.

In block S620, when the head rotation acceleration of the user is greater than the preset threshold, block S630 is implemented. When the head rotation acceleration of the user is less than or equal to the preset threshold, block S640 is implemented.

At block S630, the electrical power to the AR device is switched to a third power, wherein the third power is less than the second power.

At block S640, the electrical power to the AR device is unchanged.

In this embodiment, the electrical power to the AR device is divided into three levels. When an angle between the line of sight of the user and the gravity direction is greater than or equal to 90 degrees, or an angle between the head rotation direction of the user and the gravity direction is greater than or equal to 90 degrees, the electrical power to the AR device is the highest level, which is the first power. When an angle between the line of sight of the user and the gravity direction is less than 90 degrees, or an angle between the head rotation direction of the user and the gravity direction is less than 90 degrees, the electrical power to the AR device is a middle level, which is the second power. When the head rotation acceleration of the user is greater than the preset threshold, the electrical power to the AR device is the lowest level, which is the third power.

A detailed description of the AR device is provided as follows. For example, when the AR device is a pair of AR glasses, as shown in FIG. 7, the AR glasses 100 includes a lens 110 and a frame 120.

Figure 7:
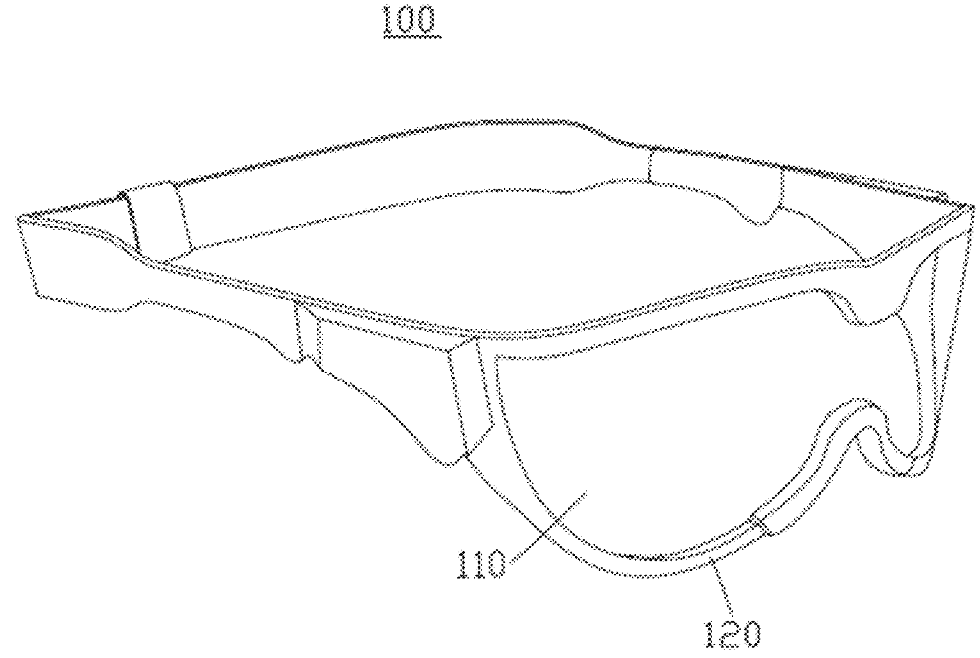
FIG. 7 is an appearance diagram of an AR device provided by an embodiment of the present disclosure.
Figure 8:
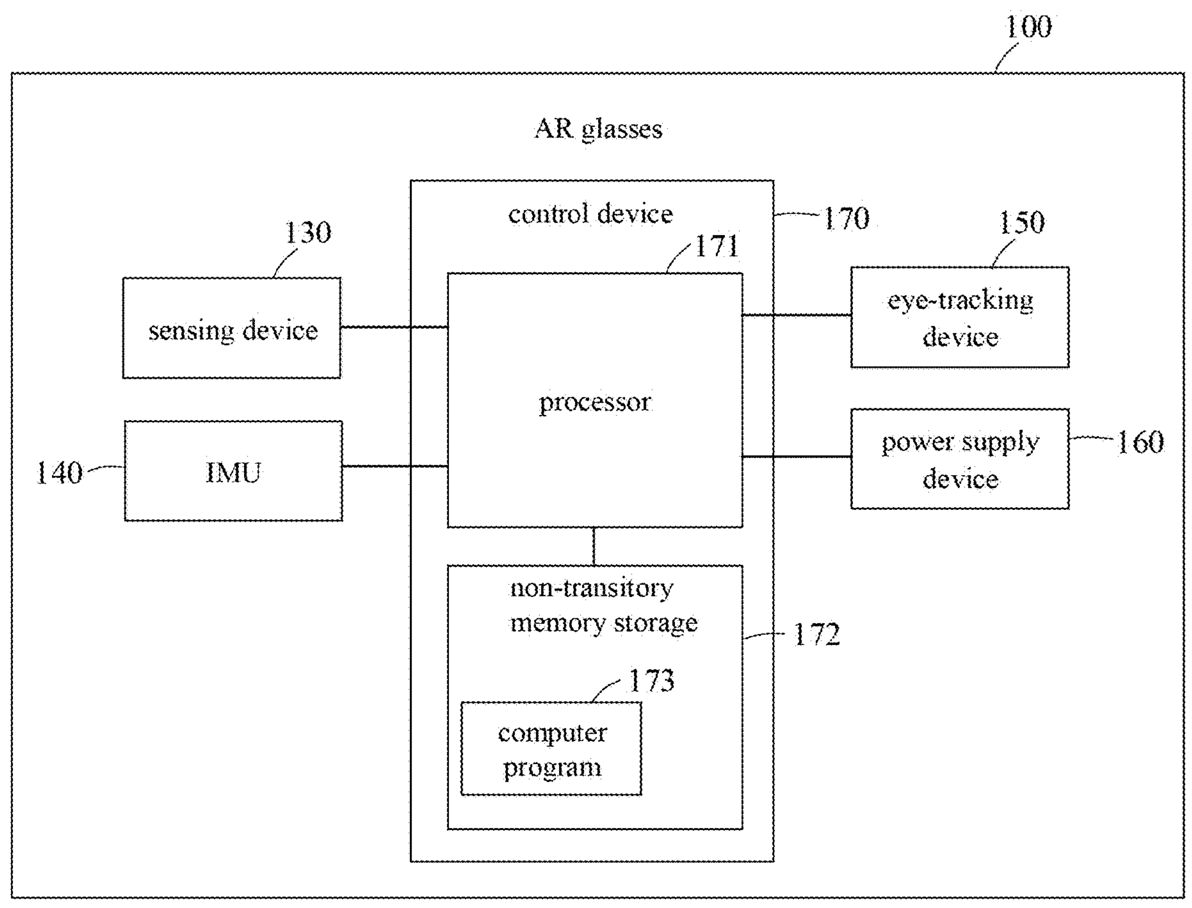
FIG. 8 is a structure diagram of the AR device shown in FIG. 7.

FIG. 8 is a structure diagram of the AR device shown in FIG. 7. As shown in FIG. 8, the AR glasses 100 includes a sensing device 130, an IMU 140, an eye-tracking device 150, a power supply device 160, and a control device 170.

The sensing device 130, the IMU 140, the eye-tracking device 150, the power supply device 160, and the control device 170 are installed on the frame 120 shown in FIG. 7. The sensing device 130, the IMU 140, the eye-tracking device 150, and the power supply device 160 are connected to the control device 170.

The sensing device 130 is used to sense environmental information and send the environmental information to the control device 170. The sensing device 130 may include a laser radar, used to emit a sensing wave outward and receive a reflected sensing wave to obtain environmental information.

The IMU unit 140 is used to detect the head rotation direction of the user and the head rotation acceleration of the user, and send the head rotation direction of the user and the head rotation acceleration of the user to the control device 170.

The eye-tracking device 150 is used to detect the line-of-sight direction of the user, and send the line-of-sight direction of the user to the control device 170.

The power supply device 160 is connected to the sensing device 130. The power supply device 160 is used to adjust an electrical power output to the sensing device 130, thereby changing its sensing distance.

The control device 170 includes a processor 171, a non-transitory memory storage 172, and a computer program 173. The non-transitory memory storage 172 coupled with the processor 171. The computer program 173 is stored in the non-transitory memory storage 172, which when executed by the processor 171 to achieve the control method described above.

In this embodiment, the processor 171 may be, but is not limited to, a central processing unit (CPU), a general-purpose processor, a digital signal processor (DSP), an application-specific integrated circuit (ASIC), a field-programmable gate array (FPGA) or another programmable logic device, a discrete gate or transistor logic device, a discrete hardware component. The general-purpose processor may be a microprocessor or any conventional processor.

In this embodiment, the non-transitory memory storage 172 may be an internal storage unit, such as a hard disk. In other embodiments, the non-transitory memory storage 172 may also be an external storage device, such as a plug-in hard disk, a smart memory card (SMC), a secure digital (SD) card, a flash card. Further, the non-transitory memory storage 172 may also include both an internal storage unit and an external storage device. The non-transitory memory storage 172 is used to store an operating system, a disclosure program, and other programs, such as a program code of the computer program. The non-transitory memory storage 172 may also be used to temporarily store data that has been output or is to be output.

In this embodiment, the computer program 173 may include, but is not limited to, a source code form, an object code form, and an executable file.

In an embodiment, the processor 171 is configured to: when the AR glasses 100 is in a worn state, acquire a line-of-sight direction of a user; when an angle between the line-of-sight direction of the user and a gravity direction is greater than or equal to 90 degrees, set an electrical power of the power supply device 160 to a first power; when the angle between the line-of-sight direction of the user and the gravity direction is less than 90 degrees, set the electrical power of the power supply device 160 to a second power, wherein the second power is less than the first power.

In another embodiment, the processor 171 is further configured to: when the electrical power of the power supply device 160 is the first power, acquire a head rotation direction of the user; when an angel between the head rotation direction of the user and the gravity direction is less than 90 degrees, switch the electrical power of the power supply device 160 to the second power.

In another embodiment, the processor 171 is further configured to: when the electrical power of the power supply device 160 is the second power, acquire a head rotation direction of the user; when an angle between the head rotation direction of the user and the gravity direction is greater than or equal to 90 degrees, switch the electrical power of the power supply device 160 to the first power.

In another embodiment, the processor 171 is further configured to: when the electrical power of the power supply device 160 is the first power, acquire a head rotation acceleration of the user; when the head rotation acceleration of the user is greater than a preset threshold, switch the electrical power of the power supply device 160 to the second power.

In another embodiment, the processor 171 is further configured to: when the electrical power of the power supply device 160 is the first power, acquire a head rotation acceleration of the user; when the head rotation acceleration of the user is greater than the preset threshold, switch the electrical power of the power supply device 160 to a third power, wherein the third power is less than the first power and greater than the second power.

In another embodiment, the processor 171 is further configured to: when the electrical power of the power supply device 160 is the second power, acquire a head rotation acceleration of the user; when the head rotation acceleration of the user is greater than the preset threshold, switch the electrical power of the power supply device 160 to a third power, wherein the third power is less than the second power.

In another embodiment, the processor 171 is further configured to: when the electrical power of the power supply device 160 is the first power, set a focal length of the lens 110 to a first focal length; when the electrical power of the power supply device 160 is the second power, set the focal length of the lens 110 to a second focal length, wherein the second focal length is less than the first focal length.

The present disclosure further provides a computer-readable storage medium, used to store a computer program, which when executed by a processor to achieve the control method described above.

The computer-readable medium may include a read-only memory (ROM), a random access memory (RAM), a USB flash drive, a mobile hard disk, a magnetic disk or an optical disk.

The above description only describes embodiments of the present disclosure, and is not intended to limit the present disclosure, various modifications and changes can be made to the present disclosure. Any modifications, equivalent substitutions, improvements, etc. made in the spirit and scope of the present disclosure are intended to be included in the scope of the present disclosure.

What is claimed is:

1. A control method for an AR device, comprising:

when the AR device is in a worn state, acquiring a line-of-sight direction of a user;

when an angle between the line-of-sight direction of the user and a gravity direction is greater than or equal to 90 degrees, setting an electrical power to the AR device to a first power;

when the angle between the line-of-sight direction of the user and the gravity direction is less than 90 degrees, setting the electrical power of the AR device to a second power, wherein the second power is less than the first power.

2. The control method of claim 1, further comprising:

when the electrical power to the AR device is the first power, acquiring a head rotation direction of the user;

when an angle between the head rotation direction of the user and the gravity direction is less than 90 degrees, switching the electrical power to the AR device to the second power.

3. The control method of claim 1, further comprising:

when the electrical power to the AR device is the second power, acquiring a head rotation direction of the user;

when an angel between the head rotation direction of the user and the gravity direction is greater than or equal to 90 degrees, switching the electrical power to the AR device to the first power.

4. The control method of claim 1, further comprising:

when the electrical power to the AR device is the first power, acquiring a head rotation acceleration of the user;

when the head rotation acceleration of the user is greater than a preset threshold, switching the electrical power to the AR device to the second power.

5. The control method of claim 1, further comprising:

when the electrical power to the AR device is the first power, acquiring a head rotation acceleration of the user;

when the head rotation acceleration of the user is greater than a preset threshold, switching the electrical power to the AR device to a third power, wherein the third power is less than the first power and greater than the second power.

6. The control method of claim 1, further comprising:

when the electrical power to the AR device is the first power, acquiring a head rotation acceleration of the user;

when the head rotation acceleration of the user is greater than a preset threshold, switching the electrical power to the AR device to a third power, wherein the third power is less than the second power.

7. The control method of claim 1, further comprising:

when the electrical power to the AR device is the first power, setting a focal length of the AR device to a first focal length;

when the electrical power to the AR device is the second power, setting the focal length of the AR device to a second focal length, wherein the second focal length is less than the first focal length.

8. An AR device, comprising:

at least one processor;

a non-transitory memory storage, coupled with the at least one processor; and a computer program stored in the non-transitory memory storage, which when executed by the at least one processor to:

when the AR device is in a worn state, acquire a line-of-sight direction of a user;

when an angle between the line-of-sight direction of the user and a gravity direction is greater than or equal to 90 degrees, set an electrical power to the AR device to a first power;

when the angle between the line-of-sight direction of the user and the gravity direction is less than 90 degrees, set the electrical power to the AR device to a second power, wherein the second power is less than the first power.

9. The AR device of claim 8, the at least one processor is further configured to:

when the electrical power to the AR device is the first power, acquire a head rotation direction of the user;

when an angle between the head rotation direction of the user and the gravity direction is less than 90 degrees, switch the electrical power to the AR device to the second power.

10. The AR device of claim 8, the at least one processor is further configured to:

when the electrical power to the AR device is the second power, acquire a head rotation direction of the user;

when an angle between the head rotation direction of the user and the gravity direction is greater than or equal to 90 degrees, switch the electrical power to the AR device to the first power.

11. The AR device of claim 8, the at least one processor is further configured to:

when the electrical power to the AR device is the first power, acquire a head rotation acceleration of the user;

when the head rotation acceleration of the user is greater than a preset threshold, switch the electrical power to the AR device to the second power.

12. The AR device of claim 8, the at least one processor is further configured to:

when the electrical power to the AR device is the first power, acquire a head rotation acceleration of the user;

when the head rotation acceleration of the user is greater than a preset threshold, switch the electrical power to the AR device to a third power, wherein the third power is less than the first power and greater than the second power.

13. The AR device of claim 8, the at least one processor is further configured to:

when the electrical power to the AR device is the first power, acquire a head rotation acceleration of the user;

when the head rotation acceleration of the user is greater than a preset threshold, switch the electrical power to the AR device to a third power, wherein the third power is less than the second power.

14. The AR device of claim 8, the at least one processor is further configured to:

when the electrical power to the AR device is the first power, set a focal length of the AR device to a first focal length;

when the electrical power to the AR device is the second power, set the focal length of the AR device to a second focal length, wherein the second focal length is less than the first focal length.

15. A non-transitory computer-readable storage medium, storing a computer program, which when executed by a processor to:

when an AR device is in a worn state, acquire a line-of-sight direction of a user;

when an angle between the line-of-sight direction of the user and a gravity direction is greater than or equal to 90 degrees, set an electrical power to the AR device to a first power;

when the angle between the line-of-sight direction of the user and the gravity direction is less than 90 degrees, set the electrical power to the AR device to a second power, wherein the second power is less than the first power.

16. The non-transitory computer-readable storage medium of claim 15, the processor is further configured to:

when the electrical power to the AR device is the first power, acquire a head rotation direction of the user;

when an angle between the head rotation direction of the user and the gravity direction is less than 90 degrees, switch the electrical power to the AR device to the second power.

17. The non-transitory computer-readable storage medium of claim 15, the processor is further configured to:

when the electrical power to the AR device is the second power, acquire a head rotation direction of the user;

when an angle between the head rotation direction of the user and the gravity direction is greater than or equal to 90 degrees, switch the electrical power to the AR device to the first power.

18. The non-transitory computer-readable storage medium of claim 15, the processor is further configured to:

when the electrical power to the AR device is the first power, acquire a head rotation acceleration of the user;

when the head rotation acceleration of the user is greater than a preset threshold, switch the electrical power to the AR device to a third power, wherein the third power is less than the first power and greater than the second power.

19. The non-transitory computer-readable storage medium of claim 15, the processor is further configured to:

when the electrical power to the AR device is the first power, acquire a head rotation acceleration of the user;

when the head rotation acceleration of the user is greater than a preset threshold, switch the electrical power to the AR device to a third power, wherein the third power is less than the second power.

20. The non-transitory computer-readable storage medium of claim 15, the processor is further configured to:

when the electrical power to the AR device is the first power, set a focal length of the AR device to a first focal length;

when the electrical power to the AR device is the second power, set the focal length of the AR device to a second focal length, wherein the second focal length is less than the first focal length.

* * * * *